(12) United States Patent
Kwak (10) Patent No.: US 12,524,156 B2
(45) Date of Patent: Jan. 13, 2026

(54) MEMORY DEVICE FOR CONTROLLING DATA OUTPUT TIME

(71) Applicant: SK hynix Inc., Icheon-si (KR)

(72) Inventor: Dong Hun Kwak, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 337 days.

(21) Appl. No.: 18/325,788

(22) Filed: May 30, 2023

(65) Prior Publication Data

US 2024/0176495 A1    May 30, 2024

(30) Foreign Application Priority Data

Nov. 25, 2022    (KR) .......... 10-2022-0160520

(51) Int. Cl.
*G11C 8/06*    (2006.01)
*G06F 3/06*    (2006.01)

(52) U.S. Cl.
CPC .......... *G06F 3/0613* (2013.01); *G06F 3/0659* (2013.01); *G06F 3/0679* (2013.01); *G11C 8/06* (2013.01)

(58) Field of Classification Search
CPC .................................... G11C 8/06; G11C 7/22
See application file for complete search history.

(56) References Cited

U.S. PATENT DOCUMENTS

| 8,867,698 B2* | 10/2014 | Kwon | H03K 21/38 |
| | | | 377/118 |
| 9,898,403 B2* | 2/2018 | Tanaka | G11C 16/34 |
| 9,911,479 B2* | 3/2018 | Jeong | G11C 7/1045 |
| 10,861,518 B2* | 12/2020 | Kim | G11C 11/4096 |
| 11,163,328 B1* | 11/2021 | Bae | H03K 5/133 |
| 2010/0146237 A1* | 6/2010 | Takai | G11C 7/22 |
| | | | 711/E12.001 |
| 2014/0286096 A1* | 9/2014 | Chong | G11C 16/26 |
| | | | 365/185.06 |
| 2021/0012834 A1* | 1/2021 | Hsu | G11C 16/08 |

FOREIGN PATENT DOCUMENTS

| KR | 1020200027486 A | 3/2020 |
| KR | 1020210077451 A | 6/2021 |

* cited by examiner

*Primary Examiner* — Hoai V Ho
*Assistant Examiner* — Anthony Thinh Tang
(74) *Attorney, Agent, or Firm* — WILLIAM PARK AND ASSOCIATES LTD.

(57) ABSTRACT

A memory device comprises a memory cell, a delay information storage configured to store delay information associated with a time at which data stored in the memory cell is output, and an operation controller configured to output the data to an external device after delaying a time corresponding to the delay information from a time of discharging a voltage provided to the memory cell.

20 Claims, 8 Drawing Sheets

MEMORY DEVICE FOR CONTROLLING DATA OUTPUT TIME

CROSS-REFERENCE TO RELATED APPLICATION

The present application claims priority under 35 U.S.C. § 119(a) to Korean patent application number 10-2022-0160520 filed on Nov. 25, 2022, in the Korean Intellectual Property Office, the entire disclosure of which is incorporated by reference herein.

BACKGROUND

1. Technical Field

Various embodiments of the present disclosure relate to a memory device, and more particularly, to a memory device controlling a data output time.

2. Related Art

A memory system may store data in response to the control of a host device, such as a computer or a smartphone. The memory system may include a memory device that stores data and a memory controller that controls the memory device. In response to a read request for the stored data, the memory device may read data stored in memory cells and transfer the read data to a host. The memory device may discharge a voltage applied to an internal circuit to prepare a subsequent operation when the read data is transferred to the host. A time during which the read data is output may be reduced as a data input/output speed gradually increases. As an integration degree of the memory device increases, a time during which the voltage applied to the internal circuit is discharged may increase. As the discharge time increases, the performance of the memory device may be degraded. Thus, various methods for improving the performance are being required.

SUMMARY

According to an embodiment, a memory device may include a memory cell, a delay information storage configured to store delay information associated with a time at which data stored in the memory cell is output, and an operation controller configured to output the data to an external device after delaying a time corresponding to the delay information from a time of discharging a voltage provided to the memory cell.

According to another embodiment, a memory device may include a state signal output circuit configured to output a state signal indicating a state being capable of receiving a command from an external device, a delay information storage configured to store delay information regarding a delay time for outputting of the state signal, and an operation controller configured to control the state signal output circuit to output the state signal after the delay time passes, the delay time starting from a time at which a voltage used in an internal operation starts to be discharged after the internal operation has been performed.

According to another embodiment, a memory device may include a delay information generator configured to generate output delay information used to delay an outputting of data by using an input from an external device, a state signal output circuit configured to output a state signal to the external device, the state signal indicating a state being capable of receiving a command from the external device, and an operation controller configured to control the state signal output circuit to output the state signal after a time, corresponding to the output delay information, passes when an internal operation has been completed.

According to another embodiment, a memory device may include a data measurement unit measuring data output information indicating a time required to output first data acquired during a first read operation, an output delay information operation unit calculating output delay information based on a comparison between the data output information and discharge information, the discharge information being a time taken to discharge a voltage used in the first read operation, and an operation controller outputting data acquired during a second operation to an external device after a delay time, corresponding to the output delay information, passes, the delay time staring from a time at which a voltage used in the second operation has been discharged.

DETAILED DESCRIPTION

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Hereinafter, exemplary embodiments of the present disclosure will be described in detail with reference to the accompanying drawings in order for those skilled in the art to be able to readily implement the technical spirit of the present disclosure.

The present disclosure provides a memory device and a method of operating the same in which discharging a voltage applied to an internal circuit of the memory device is completed when read data is output.

Figure 1:
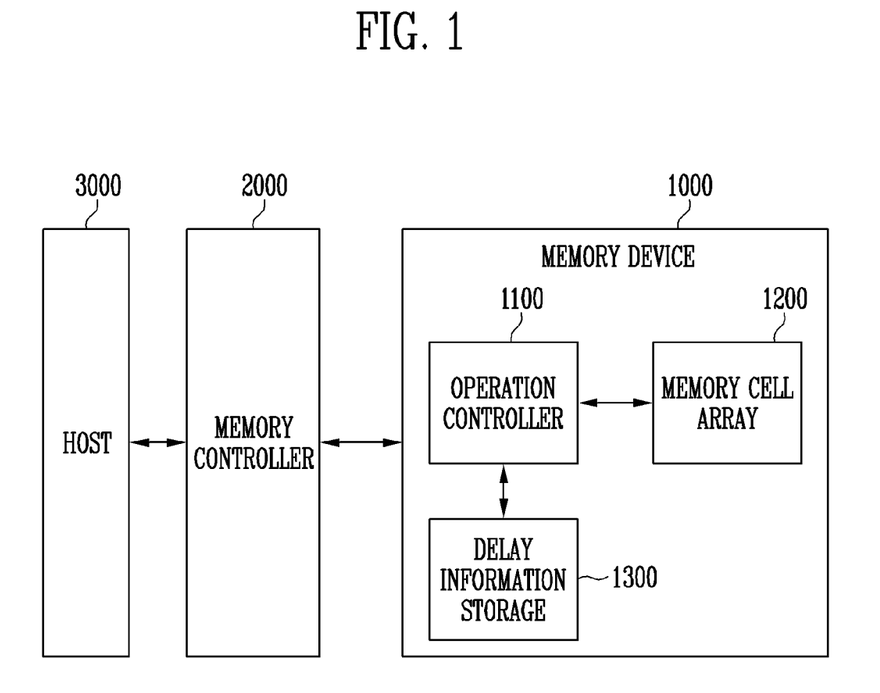
FIG. 1 is a block diagram illustrating a memory system according to an embodiment of the present disclosure.

FIG. 1 is a block diagram illustrating a memory system according to an embodiment of the present disclosure.

Referring to FIG. 1, the memory system may include a memory controller 2000 and a memory device 1000.

The memory system may store or read data in response to the control of a host 3000. Examples of the memory system may include cellular phones, smartphones, laptop computers, desktop computers, tablet PCs, and the like.

The memory system may be manufactured as one of various types of storage devices according to a host interface corresponding to a communication method with the host 3000. For example, the memory system may be configured as any one of various kinds of storage devices, such as a solid state drive (SSD), a multimedia card in the form of an eMMC, a secure digital (SD) card, and a universal serial bus (USB).

The memory device 1000 may include a memory cell array 1200 including a plurality of memory cells that store data. The memory cell array may include a plurality of memory blocks (not shown). Each of the memory blocks may include a plurality of memory cells (not shown). One memory block may include a plurality of pages. A page may be a unit for storing data in the memory device 1000 or may be a unit for reading data stored in the memory device 1000.

According to an embodiment, each of the plurality of memory cells which are included in the memory cell array 1200 may be nonvolatile memory cells. When the plurality of memory cells included in the memory cell array 1200 include nonvolatile memory cells, data stored in the memory cells may be maintained even when power supply to memory device 1000 is blocked. In the specification, by way of example, features and aspects of the invention are described in the context in which the memory device 1000 is a NAND flash memory.

The memory device 1000 may operate in response to control of the memory controller 2000. The memory device 1000 may receive a command and an address from the memory controller 2000. The memory device 1000 may be configured to access an area selected in the memory cell array in response to the received address. The memory device 1000 may perform an operation corresponding to the received command on the selected area. For example, the memory device 1000 may perform a program operation (write), a read operation (read), and an erase operation (erase).

A read operation of the memory device 1000 may be performed to acquire data that is stored in memory cells. During the read operation, a read voltage may be applied to the memory cells that store the data, and the data stored in the memory cells may be sensed with the read voltage applied to the memory cells. Threshold voltages of the memory cells may be determined by the stored data. Thus, the read operation may be performed to identify a state of each of the threshold voltages of the memory cells. The data sensed from the memory cells may be stored in a page buffer (not shown) of the memory device. The memory controller 2000 may receive data which is temporarily stored in the page buffer. Subsequently, in response to a request from the host 3000, the memory controller 2000 may transfer data read from a memory cell to the host 3000. Hereinafter, the transfer of the data read by the memory device 1000 to the memory controller 2000 will be defined as data output.

According to an embodiment, the memory device 1000 may reorganize an internal operation so as to smoothly perform a subsequent operation after performing the read operation. The internal operation may refer to an operation performed to boost or lower some voltages that are used to operate the memory device 1000 or may maintain these voltages at predetermined voltage levels. In the present disclosure, the operation of reorganizing the internal operation is defined as a discharge operation.

According to an embodiment, the memory device 1000 may perform data output while the discharge operation is being performed. The discharge operation and the data output may be performed independently of each other since data read from a memory cell is stored in a page buffer (not shown).

According to an embodiment, the memory device 1000 may include an operation controller 1100 and a delay information storage 1300.

The operation controller 1100 may control general internal signals for the memory device 1000 to perform operations. For example, during a read operation, the operation controller 1100 may provide a voltage and a signal for performing a read operation to the memory device 1000. In addition, the operation controller 1100 may provide a signal for a discharge operation to an internal circuit of the memory device 1000. In addition, the operation controller 1100 may provide a data output signal to the page buffer (not shown).

The delay information storage 1300 may store delay information which delays data output. For example, the delay information may refer to direct time information or information regarding converted codes. The delay information storage 1300 may provide the delay information to the operation controller 1100.

According to an embodiment, the operation controller 1100 may control a data output time, the time at which data is output to the memory controller 2000 from the memory device 1000. The operation controller 1100 may delay applying the data output signal to the page buffer (not shown) by using the delay information provided from the delay information storage 1300.

Figure 2:
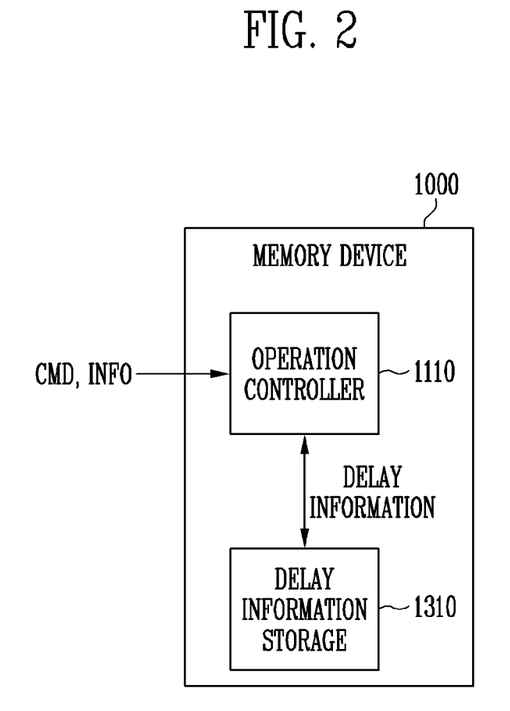
FIG. 2 is a diagram illustrating an embodiment in which a memory device receives delay information from an external device.

FIG. 2 is a diagram illustrating an embodiment in which the memory device 1000 receives delay information from the external device.

Referring to FIG. 2, an operation controller 1110 may receive a command and information for internal operations from the memory controller 2000. A delay information storage 1310 may store delay information in advance. According to an embodiment, the command that is received from the memory controller 2000 may be a delay information update command for updating the delay information received from the memory controller 2000. The operation controller 1110 may receive information regarding new delay information after receiving the delay information update command. According to an embodiment, the operation controller 1110 may update the delay information that is stored in the delay information storage 1310 by using delay information that is input after the delay information update command.

Figure 3:
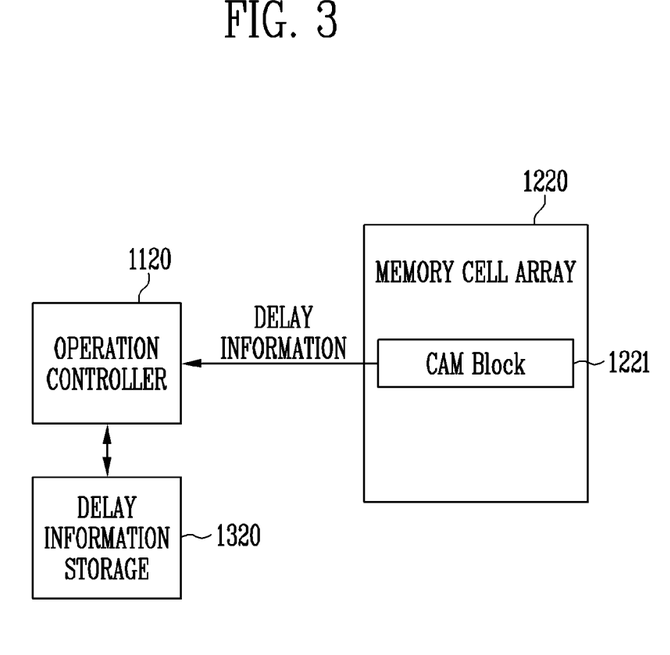
FIG. 3 is a diagram illustrating an embodiment in which a memory device prestores delay information.

FIG. 3 is a diagram illustrating an embodiment in which the memory device 1000 prestores delay information.

Referring to FIG. 3, a memory cell array 1220 may include a contents addressable memory (CAM) block 1221 that stores basic setup information for operations of the memory device 1000. The CAM block 1221 may store information for the memory device 1000 to perform operations. For example, information regarding a program start voltage, a program pulse application time, and a read voltage level that are set for a memory to operate may be stored in the CAM block 1221. The CAM block 1221 may include a non-volatile memory block since the setup information is to be stored in the CAM block 1221 of the memory device 1000 to which power is not applied. When power is applied to the memory device 1000, the memory device 1000 may read the information stored in the CAM block 1221 and may be set beforehand to perform operations.

Information that is stored in the CAM block 1221 may include delay information. The delay information may be used by the memory device 1000 to output data to an external device. When power is applied to the memory device 1000, an operation controller 1120 may receive the delay information that is stored in the CAM block 1221. The operation controller 1120 may store the received delay information in a delay information storage 1320.

Figure 4:
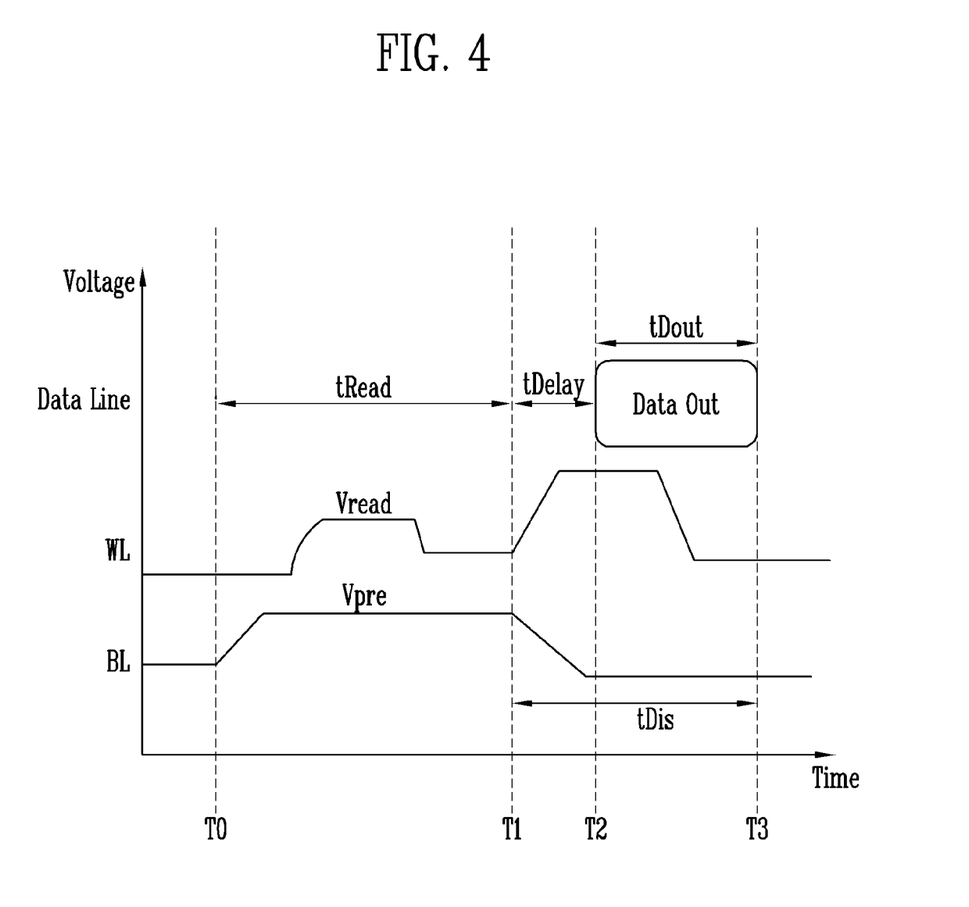
FIG. 4 is a timing chart illustrating a data output operation of a memory device of FIG. 1.

FIG. 4 is a timing chart illustrating a data output operation of the memory device 1000 of FIG. 1.

Referring to FIGS. 1 and 4, a word line WL and a bit line BL may correspond to a word line and a bit line, coupled to each memory cell, to which internal voltages are applied when data is read. An internal voltage may be a voltage that is applied to the memory cell array 1200 by the operation controller 1100, which is described with reference to FIG. 1. A data line may transfer data from a page buffer (not shown) of the memory device 1000 to the memory controller 2000.

A T0-T1 interval may refer to an interval tRead corresponding to a read operation of the memory device 1000. During the T0-T1 interval, a voltage for reading data may be applied to the word line WL coupled to a target memory cell from which data is read. A read voltage Vread may be applied to the word line WL that is coupled to the target memory cell in order to read the data from the target memory cell. The voltage may drop to sense data after the read voltage Vread has been applied for a predetermined time. A pass voltage Vpass may be applied to a word line that is not coupled to the target memory cell (not shown). A precharge voltage Vpre for reading data may be applied to the bit line BL. The precharge voltage Vpre that is applied to the bit line BL may be applied earlier than the read voltage Vread is applied to the word line WL. The precharge voltage Vpre that is applied to the bit line BL may be maintained or may drop according to a state of the target memory cell and the read voltage Vread applied to the word line WL. According to the embodiment shown in FIG. 4, the precharge voltage Vpre applied to the bit line BL may be maintained. At time T1, the read operation may be completed so that data may be stored in the page buffer (not shown). During the T1-T3 interval, a discharge operation of the memory device 1000 may be performed. After time T1, a set voltage for a subsequent operation may be applied to the word line WL and the bit line BL. The bit line BL voltage may be discharged to a ground voltage.

The operation controller 1100 may delay data output during an interval tDelay corresponding to the delay information. Therefore, the data output from the memory device 1000 to the memory controller 2000 may start after a time T2. More specifically, the memory device 1000 may perform data output "Data Out" during an interval tDout, which is the T2-T3 interval. To start a subsequent operation after the data output is completed, a data output completion time and a discharge completion time tDis may be the same as each other. According to various embodiments, a discharge operation may be completed first before the data output is completed.

The minimum level of description necessary to understand a read operation and a discharge operation according to this embodiment has been made. However, the present disclosure is not limited thereto. An internal operation for the read operation and the discharge operation may vary.

Figure 5:
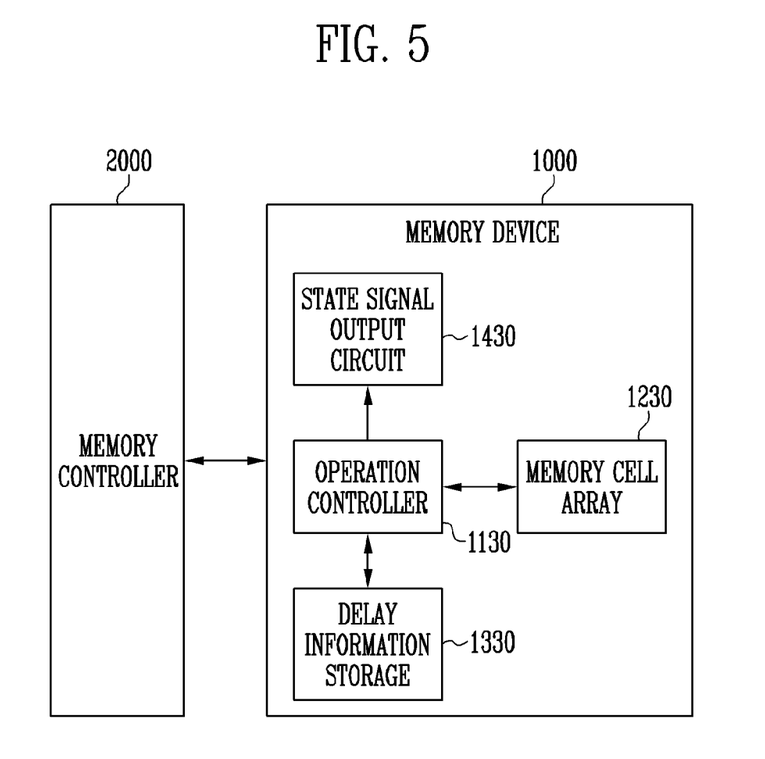
FIG. 5 is a block diagram illustrating a memory system according to another embodiment of the present disclosure.

FIG. 5 is a block diagram illustrating a memory system according to another embodiment of the present disclosure.

Referring to FIG. 5, the memory device 1000 of the memory system may include an operation controller 1130, a memory cell array 1230, a delay information storage 1330, and a state signal output circuit 1430. A description of some components of the memory device 1000 that are the same as those of FIG. 1 will be omitted.

According to an embodiment, the operation controller 1130 may control the state signal output circuit 1430. For example, when a read operation is completed, the operation controller 1130 may transfer a read operation completion signal to the state signal output circuit 1430.

The operation controller 1130 may control a time at which the read operation completion signal is transferred by using the delay information provided by the delay information storage 1330.

The state signal output circuit 1430 may receive the read operation completion signal and may output a state signal of the memory device 1000 to an external device. The state signal may indicate an internal state of the memory device 1000. The state signal output circuit 1430 may output a state signal which indicates that the memory device 1000 is able to receive a command from an external device in response to the read operation completion signal.

The memory controller 2000 may transfer a request from the host 3000 to the memory device 1000 according to the state signal of the memory device 1000. Therefore, after the state signal is activated, the memory device 1000 may output the data that is read from the memory cell to the memory controller 2000 in response to the request of the memory controller 2000.

Figure 6:
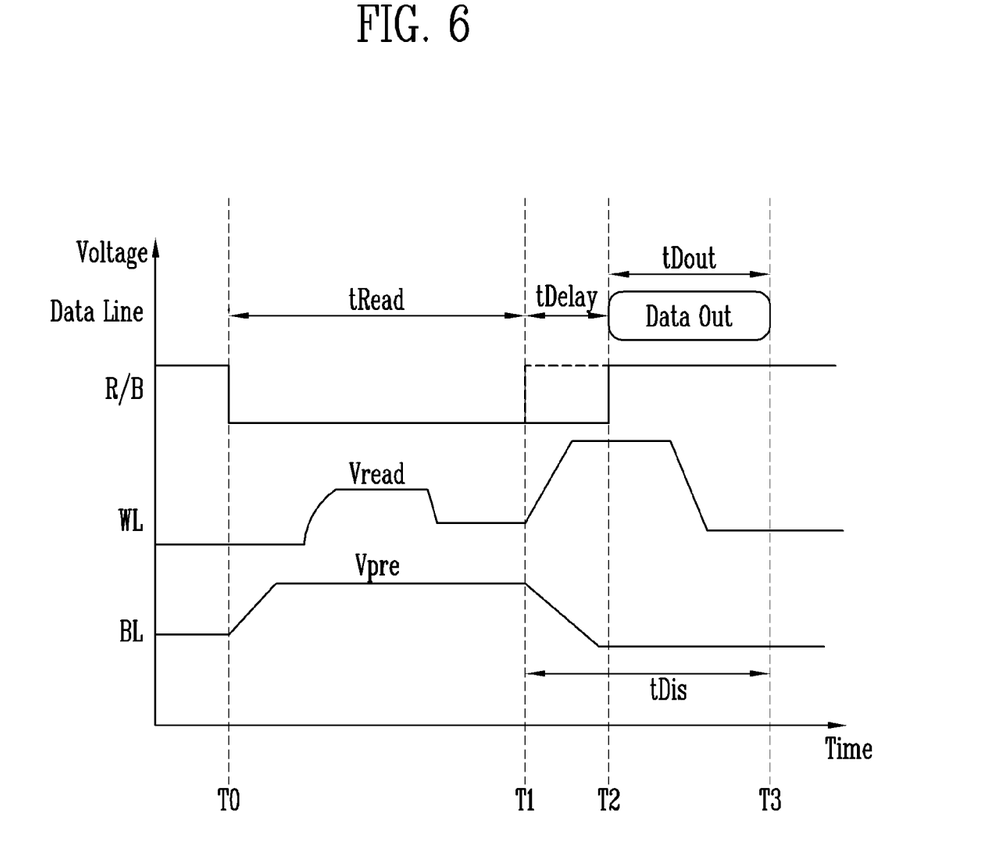
FIG. 6 is a diagram illustrating a state signal output operation of a memory device of FIG. 5.

FIG. 6 is a diagram illustrating a state signal output operation of the memory device 1000 of FIG. 5.

A description of some portions of FIG. 6 that are the same as those of FIG. 4 will be omitted.

Referring to FIG. 6, read-busy (R/B) may refer to the state signal that is output by the state signal output circuit 1430. When the read-busy (R/B) is deactivated, the memory device 1000 may be in a busy state. The memory device 1000 may ignore an external signal since the memory device 1000 is performing an internal operation. Alternatively, an external device might not provide any signal to the memory device 1000 when the memory device 1000 is in the busy state. When the read-busy (R/B) is activated, the memory device 1000 may be in a ready state. In other words, the memory device 1000 may be in the ready state such that the memory device 1000 is ready to receive an external input. Alternatively, the external device may provide a signal to the memory device 1000 when the memory device 1000 is in the ready state. A read-busy signal may be deactivated during the interval tRead corresponding to the read operation. At time T1, the read operation may be completed. Since the read operation is completed, a discharge operation may be performed during the T1-T3 interval. The operation controller 1130 may delay transferring the read operation completion signal during an interval tDelay corresponding to delay information. The state signal output circuit 1430 may output the read-busy signal activated after time T2. Data output may be performed during the T2-T3 interval.

Figure 7:
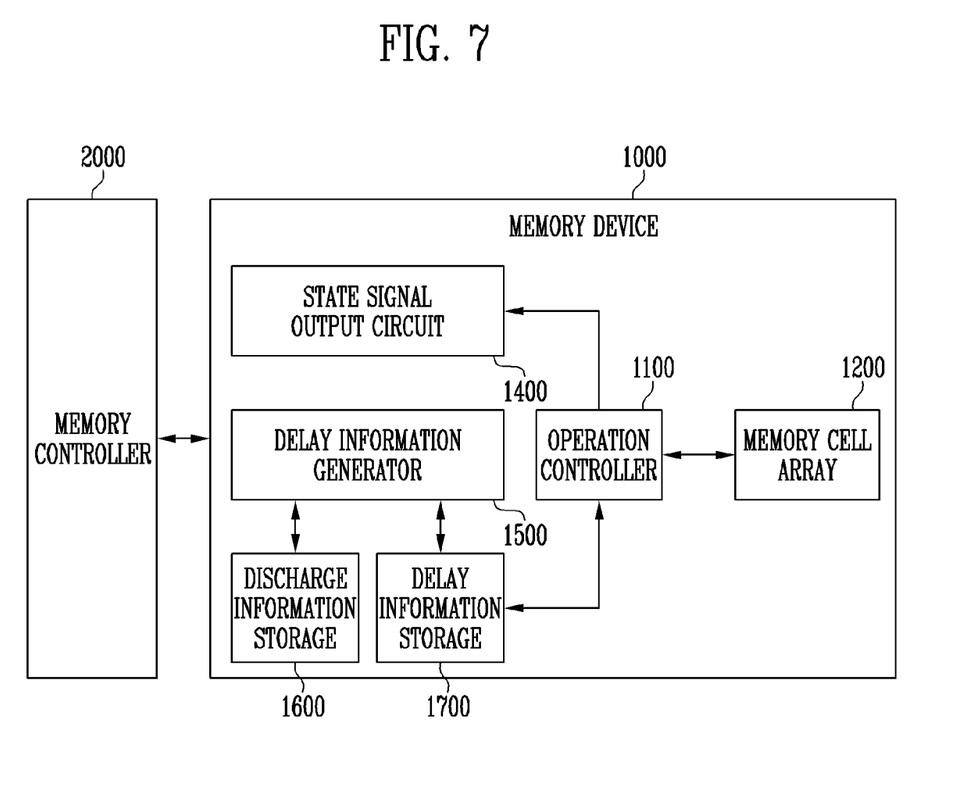
FIG. 7 is a block diagram illustrating a memory system according to another embodiment of the present disclosure.

FIG. 7 is a block diagram illustrating the memory system according to another embodiment of the present disclosure.

Referring to FIG. 7, the memory device 1000 may include an operation controller 1100, a memory cell array 1200, a state signal output circuit 1400, delay information generator 1500, discharge information storage 1600 and delay information storage 1700. In FIG. 7, the operation controller 1100 may correspond to the operation controller 1130 of FIG. 5, the memory cell array 1200 may correspond to the memory cell array 1230 of FIG. 5, the state signal output circuit 1400 may correspond to the state signal output circuit 1430 of FIG. 5, and the delay information storage 1700 may correspond to the delay information storage 1330 of FIG. 5.

A description of some portions of FIG. 7 which are the same as those of FIG. 5 will be omitted.

The delay information generator 1500 may generate output delay information that is used to delay data output by using external clock information for outputting the data. The external clock information may be a read enable signal RE that is input to the memory device for data output after a read operation or a data strobe signal DQS that is generated based on the read enable signal RE. The output delay information generated by the delay information generator 1500 may be transferred to a delay information storage 1700.

The discharge information storage 1600 may store discharge time information around a time at which a discharge operation of the internal circuit of the memory device 1000 is completed. The discharge time information may include a code that is to be converted. The discharge time information may correspond to a value that is measured in advance and stored.

The delay information storage 1700 may store the output delay information that is generated by the delay information generator 1500 and may transfer the output delay information to the operation controller 1100 in response to the control of the operation controller 1100.

According to an embodiment, the operation controller 1100 may control the time at which the read operation completion signal is transferred by using the output delay information provided by the delay information storage 1700.

Figure 8:
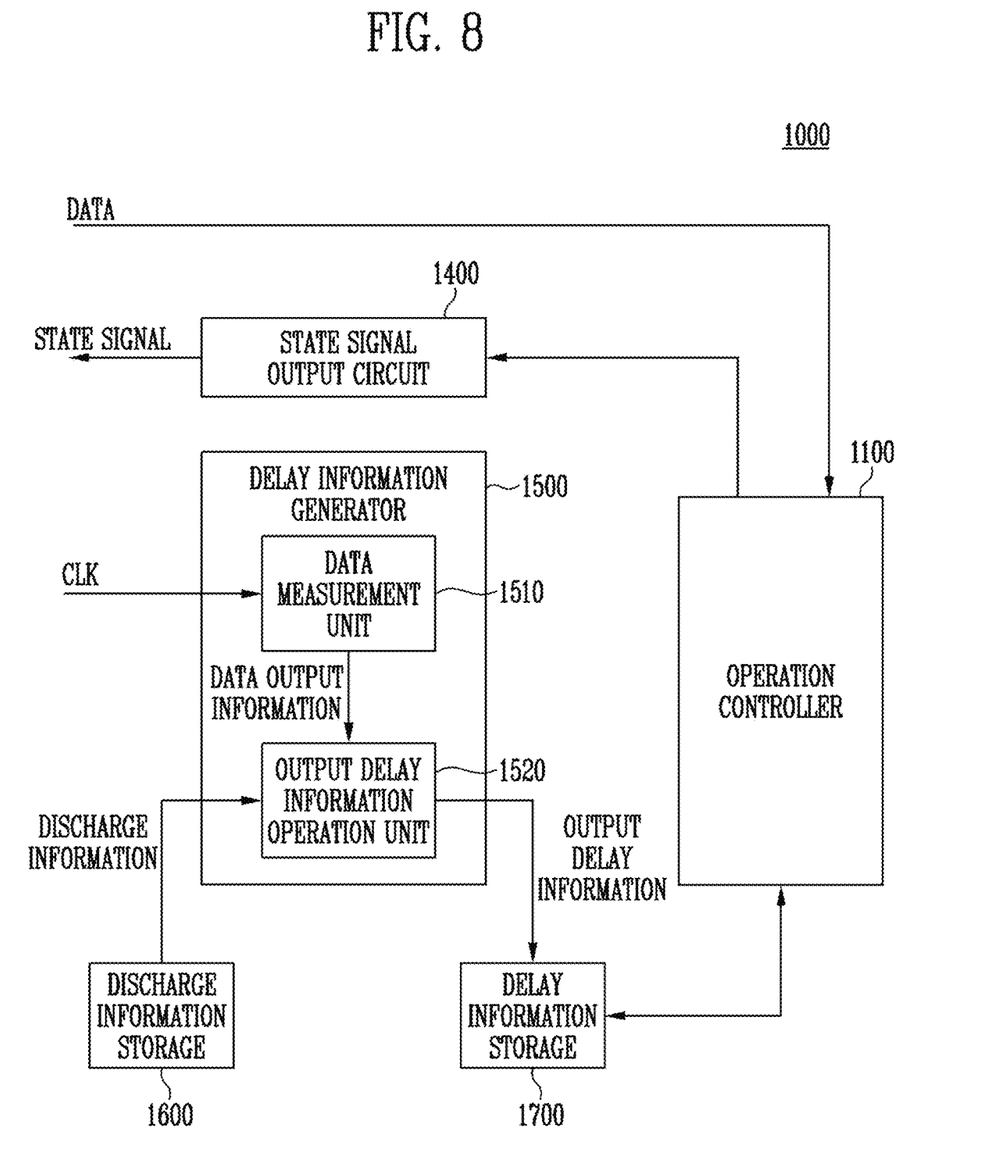
FIG. 8 is a diagram illustrating the structure of a memory device of FIG. 7.

FIG. 8 is a detailed diagram illustrating the structure of the memory device 1000 of FIG. 7.

Referring to FIG. 8, the delay information generator 1500 of the memory device 1000 may include a data measurement unit 1510 and an output delay information operation unit 1520.

The data measurement unit 1510 may measure a clock that is input from an external device. For example, after the read operation is completed, the memory controller 2000 may apply a read enable signal RE to the memory device 1000 to externally output the read data to a device outside of the memory device 1000. Whenever the read enable signal RE applied to the memory device 1000 toggles between a rising edge and a falling edge, the data stored in the page buffer may be sequentially output to an external device through a data line. The data measurement unit 1510 may measure a time taken to output the data by counting the number of toggles of the read enable signal RE that is applied to the memory device 1000.

In another embodiment, a clock that is measured by the data measurement unit 1510 may be a clock in the memory device 1000. For example, the memory device 1000 may generate an internal clock data strobe signal DQS for outputting data. The data strobe signal DQS may be generated based on an external clock input or an internal reference clock. The data measurement unit 1510 may measure the toggle count of the data strobe signal DQS. The measured value may be used as data output information. The data measurement unit 1510 may transfer the data output information to the output delay information operation unit 1520. According to an embodiment, the data output information may be measured for every data output.

The output delay information operation unit 1520 may receive the data output information and the discharge information and may calculate the output delay information. The discharge information and the data output information may be information regarding time. The output delay information operation unit 1520 may compare the data output time with the discharge time. More specifically, when the data output time is greater than or equal to the discharge time, the output delay information may be 0 (zero). The difference between the discharge time and the data output time may be determined as an output delay information value. The determined output delay information may be provided to the delay information storage 1700.

Figure 9:
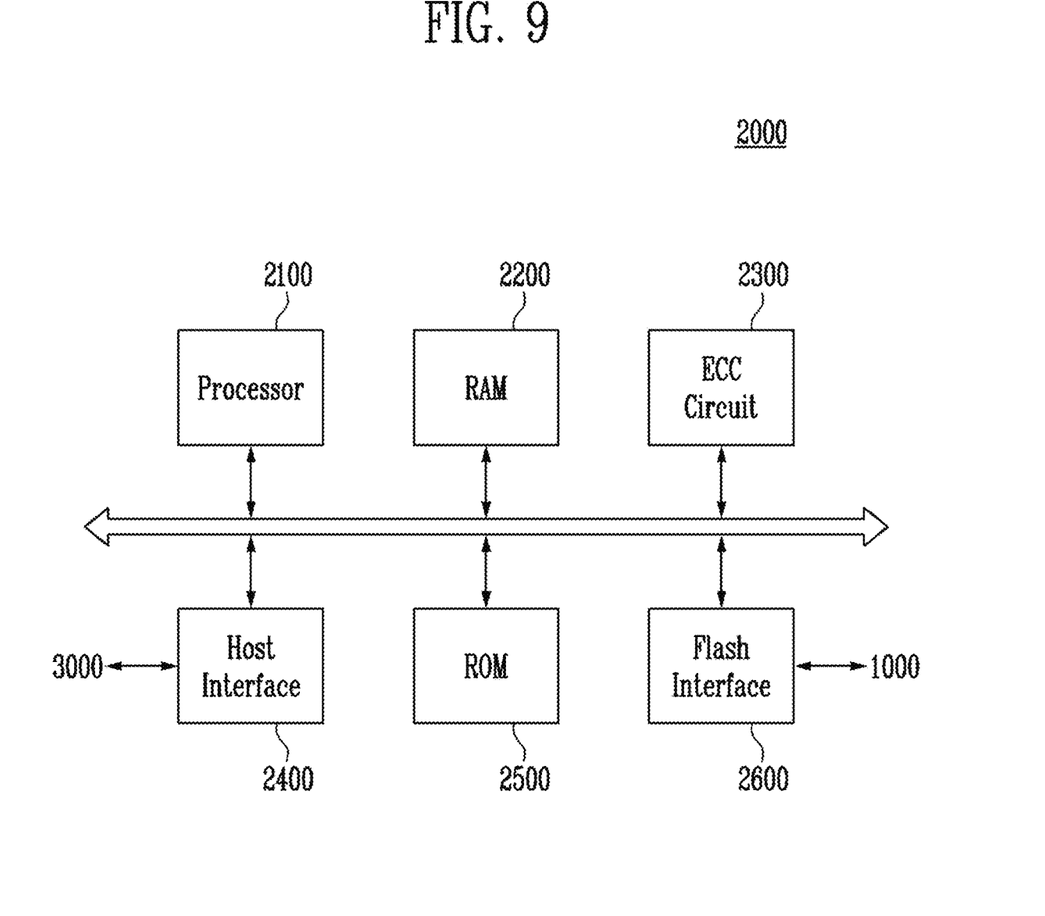
FIG. 9 is a diagram illustrating another embodiment of a memory controller of FIG. 1.

FIG. 9 is a diagram illustrating another embodiment of the memory controller 2000 shown in FIG. 1.

Referring to FIG. 9, the memory controller 2000 may include a processor 2100, a RAM 2200, an ECC circuit 2300, a host interface 2400, a ROM 2500, and a flash interface 2600.

The processor 2100 may control general operations of the memory controller 2000.

The RAM 2200 may serve as a buffer memory, a cache memory, or a working memory of the memory controller 2000.

The ROM 2500 may store various kinds of information in the form of firmware that is required for the memory controller 2000 to operate.

The memory controller 2000 may communicate with an external device (e.g., the host 3000, an application processor, etc.) through the host interface 2400.

The memory controller 2000 may communicate with the memory device 1000 through the flash interface 2600. The memory controller 2000 may transfer a command CMD, an address ADDR, and a control signal CTRL to the memory device 1000 or may receive data through the flash interface 2600. For example, the flash interface 2600 may include a NAND interface.

According to the present disclosure, a memory device having improved read efficiency and an operating method thereof may be provided.

Accordingly, performance of the memory device may be improved.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A memory device, comprising:
   a memory cell;
   a delay information storage configured to store delay information associated with a time at which data stored in the memory cell is output; and
   an operation controller configured to output the data to an external device after delaying a time corresponding to the delay information from a time of discharging a voltage provided to the memory cell.

2. The memory device of claim 1, further comprising a non-volatile memory area storing the delay information.

3. The memory device of claim 2, wherein the non-volatile memory area is one of a plurality of memory blocks.

4. The memory device of claim 2, wherein the operation controller stores the delay information stored in the non-volatile memory area in the delay information storage when power is applied.

5. The memory device of claim 1, wherein the operation controller updates the delay information according to information input from the external device.

6. The memory device of claim 1, wherein the delay information is updated by a command input from the external device.

7. The memory device of claim 1, wherein the operation controller outputs the data to the external device while the voltage is being discharged.

8. The memory device of claim 1, wherein the outputting of the data is completed simultaneously with or later than the discharging.

9. A memory device, comprising:
   a state signal output circuit configured to output a state signal indicating a state being capable of receiving a command from an external device;
   a delay information storage configured to store delay information regarding a delay time for outputting of the state signal; and
   an operation controller configured to control the state signal output circuit to output the state signal after the delay time passes, the delay time starting from a time at which a voltage used in an internal operation starts to be discharged after the internal operation has been performed.

10. The memory device of claim 9, further comprising memory cells configured to store data,
   wherein the internal operation includes a read operation for reading the data.

11. The memory device of claim 10, wherein the operation controller outputs the data to the external device in response to the state signal after performing the read operation.

12. The memory device of claim 9, further comprising a non-volatile memory area configured to store the delay information.

13. The memory device of claim 12, wherein the operation controller stores the delay information stored in the non-volatile memory area in the delay information storage when power is applied.

14. The memory device of claim 9, wherein the delay information storage stores the delay information input from the external device.

15. The memory device of claim 9, wherein the operation controller updates the delay information by using information input from the external device.

16. The memory device of claim 10, wherein the operation controller discharges the voltage while the data is output.

17. A memory device, comprising:
   a delay information generator configured to generate output delay information used to delay an outputting of data by using an input from an external device;
   a state signal output circuit configured to output a state signal to the external device, the state signal indicating a state being capable of receiving a command from the external device; and
   an operation controller configured to control the state signal output circuit to output the state signal after a time, corresponding to the output delay information, passes when an internal operation has been completed.

18. The memory device of claim 17, wherein the delay information generator comprises a data measurement unit configured to generate data output information including a toggle count of a clock input from the external device.

19. The memory device of claim 18, further comprising a discharge information storage configured to include discharge information regarding a time required to discharge a voltage used in the internal operation.

20. The memory device of claim 19, wherein the delay information generator further comprises an output delay information operation unit configured to generate the output delay information based on a result of comparing the data output information with the discharge information.

* * * * *